(12) United States Patent
Yeh et al.

(10) Patent No.: US 6,852,156 B2
(45) Date of Patent: Feb. 8, 2005

(54) SELF-DISPERSING PIGMENT AND PROCESS OF MAKING AND USE OF SAME

(75) Inventors: An-Gong Yeh, Broomall, PA (US); Michael J. Eiseman, Swarthmore, PA (US); Robert Paul Held, Newark, DE (US); James L. Hohman, Newark, DE (US); Dhiren V. Patel, Hockessin, DE (US); Yia-Ching Ray, Palisades Park, NJ (US); Harry Joseph Spinelli, Wilmington, DE (US); Sandra L. Witman, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 445 days.

(21) Appl. No.: 09/863,167

(22) Filed: May 23, 2001

(65) Prior Publication Data

US 2002/0014184 A1 Feb. 7, 2002

Related U.S. Application Data

(60) Provisional application No. 60/209,718, filed on Jun. 5, 2000.

(51) Int. Cl.[7] .............................. C09D 11/00; C09C 1/44
(52) U.S. Cl. .................. 106/31.6; 106/31.65; 106/31.9; 106/478
(58) Field of Search ................................ 106/478, 31.9, 106/31.6, 31.65

(56) References Cited

U.S. PATENT DOCUMENTS

| | | | |
|---|---|---|---|
| 2,439,442 A | 4/1948 | Amon et al. | |
| 3,023,118 A | 2/1962 | Donnet et al. | |
| 3,247,003 A | 4/1966 | Pollock | |
| 3,347,632 A | 10/1967 | Parker | |
| 3,616,900 A | * 11/1971 | Cecil et al. | ..................... 209/1 |
| 3,717,494 A | * 2/1973 | Jager et al. | .................. 106/474 |
| 4,597,794 A | 7/1986 | Ohta et al. | |
| 5,085,698 A | 2/1992 | Ma et al. | |
| 5,272,201 A | 12/1993 | Ma et al. | |
| 5,395,435 A | 3/1995 | Mizobuchi | |

(List continued on next page.)

FOREIGN PATENT DOCUMENTS

| | | |
|---|---|---|
| EP | 0556649 A1 | 8/1993 |
| EP | 0802247 A2 | 10/1997 |
| EP | 0819737 A2 | 1/1998 |
| EP | 0851014 A2 | 7/1998 |
| EP | 0896986 A1 | 2/1999 |
| EP | 0969052 A1 | 1/2000 |
| EP | 0974607 A1 | 1/2000 |
| JP | 60020967 | 2/1985 |
| JP | 10168338 A | 6/1998 |
| JP | 200017190 | 1/2000 |
| WO | WO 96/18688 A1 | 6/1996 |
| WO | WO 96/18694 A2 | 6/1996 |
| WO | WO 97/47698 A1 | 12/1997 |
| WO | WO 97/49774 A2 | 12/1997 |
| WO | WO 98/06788 A1 | 2/1998 |
| WO | WO 99/51690 A1 | 10/1999 |
| WO | WO 01/10963 A1 | 2/2001 |
| WO | WO 01/25340 A1 | 4/2001 |

OTHER PUBLICATIONS

Donnet et al., A Study of the Chemical Action of Oxidants on Carbon Black, No. 294, pp 1727–1735, no date available.

*Primary Examiner*—Mark L. Bell
*Assistant Examiner*—Veronica F. Faison
(74) *Attorney, Agent, or Firm*—Bart E. Lerman

(57) ABSTRACT

A process is provided in which a pigment is oxidated with ozone in an aqueous environment in which the mixture of ozone, water and pigment is subjected to a dispersive mixing operation; and/or the pH of the mixture is maintained in a range of 6–8, whereby the pigment is self-dispersing and preferably has an acid value of less than 3 $\mu moles/M^2$. Pigments from this process and ink jet inks containing the self-dispersing pigments, are also provided.

42 Claims, 1 Drawing Sheet

U.S. PATENT DOCUMENTS

| | | |
|---|---|---|
| 5,519,085 A | 5/1996 | Ma et al. |
| 5,542,969 A | 8/1996 | Hirasa et al. |
| 5,554,739 A | 9/1996 | Belmont |
| 5,571,311 A | 11/1996 | Belmont et al. |
| 5,609,671 A | 3/1997 | Nagasawa |
| 5,672,198 A | 9/1997 | Belmont |
| 5,698,016 A | 12/1997 | Adams et al. |
| 5,707,432 A | 1/1998 | Adams et al. |
| 5,713,988 A | 2/1998 | Belmont et al. |
| 5,718,746 A | 2/1998 | Nagasawa et al. |
| 5,747,562 A | 5/1998 | Mahmud et al. |
| 5,749,950 A | 5/1998 | Mahmud et al. |
| 5,803,959 A | 9/1998 | Johnson et al. |
| 5,837,045 A | 11/1998 | Johnson et al. |
| 5,846,307 A | 12/1998 | Nagasawa et al. |
| 5,861,447 A | 1/1999 | Nagasawa et al. |
| 5,885,335 A | 3/1999 | Adams et al. |
| 5,895,522 A | 4/1999 | Belmont et al. |
| 5,912,280 A | 6/1999 | Anton et al. |
| 5,919,294 A | 7/1999 | Hirasa et al. |
| 5,922,118 A | 7/1999 | Johnson et al. |
| 5,928,419 A | 7/1999 | Uemura et al. |
| 6,005,023 A | 12/1999 | Anton et al. |
| 6,040,358 A | 3/2000 | Page et al. |
| 6,068,688 A | 5/2000 | Whitehouse et al. |
| 6,083,315 A | 7/2000 | Nakamura et al. |
| 6,099,632 A | 8/2000 | Nagasawa et al. |
| 6,123,759 A | 9/2000 | Mise et al. |
| 6,150,433 A | 11/2000 | Tsang et al. |
| 6,153,001 A * | 11/2000 | Suzuki et al. ............. 106/31.65 |
| 6,221,141 B1 | 4/2001 | Takada et al. |
| 6,221,142 B1 | 4/2001 | Wang et al. |
| 6,221,143 B1 | 4/2001 | Palumbo |
| 6,368,397 B1 * | 4/2002 | Ichizawa et al. .......... 106/31.65 |
| 6,454,846 B2 * | 9/2002 | Yatake .................... 106/31.58 |
| 6,471,763 B1 * | 10/2002 | Karl .......................... 106/478 |
| 6,488,753 B1 * | 12/2002 | Ito et al. .................... 106/31.9 |
| 6,524,383 B2 * | 2/2003 | Komatsu et al. ............. 106/493 |
| 6,572,227 B2 * | 6/2003 | Yamashita et al. .......... 347/100 |
| 2001/0032566 A1 * | 10/2001 | Yatake .................... 106/31.58 |
| 2003/0019398 A1 * | 1/2003 | Komatsu et al. ............. 106/412 |
| 2003/0029355 A1 * | 2/2003 | Miyabayashi ............ 106/31.27 |
| 2003/0101909 A1 * | 6/2003 | Langenmayr et al. ....... 106/493 |

* cited by examiner

SELF-DISPERSING PIGMENT AND PROCESS OF MAKING AND USE OF SAME

BACKGROUND OF THE INVENTION

This invention relates to self-dispersing pigments and particularly to a process of making such pigments and to the use thereof in ink jet inks.

Aqueous dispersions of pigments are known in the art and have been used in various applications, such as, inks for printing (particularly ink jet printing); waterborne paints and other coating formulations for vehicles, buildings, road markings and the like; cosmetics; pharmaceutical preparations; etc. Because pigments are typically not soluble in an aqueous vehicle, it is often required to use dispersing agents, such as, polymeric dispersants or surfactants, to produce a stable dispersion of the pigment in the vehicle.

The use of dispersing agents, however, increases the viscosity of the dispersion over what it would be without the dispersing agents. The increase in viscosity, while not particularly a problem for some uses, presents a significant disadvantage in others. For example, viscosity limitations on the end use application of the dispersion (e.g., ink jet inks) may be exceeded if binders are added to improve properties of the final product. Thus, the viscosity of the dispersion itself will reduce the formulation latitude for final products.

Self-dispersing pigments, particularly self-dispersing carbon black pigments, have been known in the art for many years. For example, U.S. Pat. No. 2,439,442 discloses a process in which a carbon black pigment is exothermically reacted with a water solution of sodium hypochlorite, or is subjecting the to electrolysis in a sodium chloride solution, or is suspended in a sodium hydroxide solution and treated with chlorine gas to alter the colloidal properties such that the carbon black will readily and spontaneously disperse in water. Inks made from these dispersions are said to be waterfast on newsprint.

Donnet et al., Étude de l' action chimique des oxydants sur le noir de carbhone, École Supérieure de Chemie de Mulhouse, No. 294 (1962) pp. 1727–1735, provides a comprehensive overview of the effect of oxidants on carbon black to render them more hydrophilic. Oxidants discussed include potassium permanganate, sodium chloride, sodium chlorate, sodium perchlorate, sodium persulfate, nitric acid and sodium hypochlorite.

U.S. Pat. No. 3,023,118 teaches a process of oxidizing carbon black with dilute nitric acid to render it more readily dispersable. U.S. Pat. No. 3,279,935 discusses gas phase oxidation of carbon black generally and, in particular, teaches a gas phase oxidation process in which carbon black is treated with an oxygen containing gas admixed with a peroxide gas. U.S. Pat. No. 3,347,632 teaches a process of making hydrophilic carbon black by reacting the carbon black in an aqueous solution of sodium hypochlorite.

There has been a flurry of activity recently to formulate inks using self-dispersing pigments. For example, U.S. Pat. No. 5,554,739 and WO 96 18688 teach the production of surface modified carbon black pigments in which the carbon black is reacted with diazonium salts. WO 97 47698 teaches treating carbon black with silicone to improve its dispersibility. Inks containing such surface modified carbon black pigments, or the use of such carbon black pigments in inks, have also been proposed in WO 96 18694; U.S. Pat. No. 5,713,988; WO 97 49774; and WO 98 06788. Treatment of carbon black pigment with an aqueous solution of a hypohalite (e.g., sodium hypochlorite) and its uses are proposed in U.S. Pat. No. 5,609,671; U.S. Pat. No. 5,718,746; EP 0 802 247 and EP 0 819 737.

All of these treatment processes in the prior art have one disadvantage or another. The gas phase oxidation can be very exothermic and thus pose a significant safety hazard. Both the gas and wet phase processes generate significant amounts of by-products which need to be removed through purification steps. To overcome these disadvantages, EP 0 896 986 discloses a process of treating carbon black with ozone in the presence of water and inks and coatings made therefrom. The carbon black produced by such a process are said to have less contaminants than prior art processes and produce more stable dispersions. Even these pigments, however, are not of sufficient quality to be commercially viable for use in demanding applications, such as, ink jet printing.

SUMMARY OF THE INVENTION

A first embodiment of the present invention provides a process for making a self-dispersing pigment comprising the step of oxidizing the pigment with ozone in an aqueous environment while simultaneously subjecting the pigment to at least one dispersive mixing operation.

Another embodiment of the invention provides a process for making a self-dispersing pigment comprising the step of oxidizing the pigment with ozone in an aqueous medium while maintaining a pH of 6–8.

Still another embodiment of the invention provides a process for making a self-dispersing pigment comprising the step of oxidizing the pigment with ozone in an aqueous medium to produce a carbon black pigment having an acid value of less than 3 $\mu$moles/M$^2$.

Variations on the above processes, in which features of the above processes are combined, are also provided by the invention.

The present invention further provides a self-dispersing pigment prepared by the above process(es).

The present invention, in another aspect, provides an aqueous dispersion comprising a pigment prepared by the above process(es).

The invention further provides the use of the self-dispersing pigment in an ink jet ink composition.

DETAILED DESCRIPTION OF THE DRAWING

Figure 1:
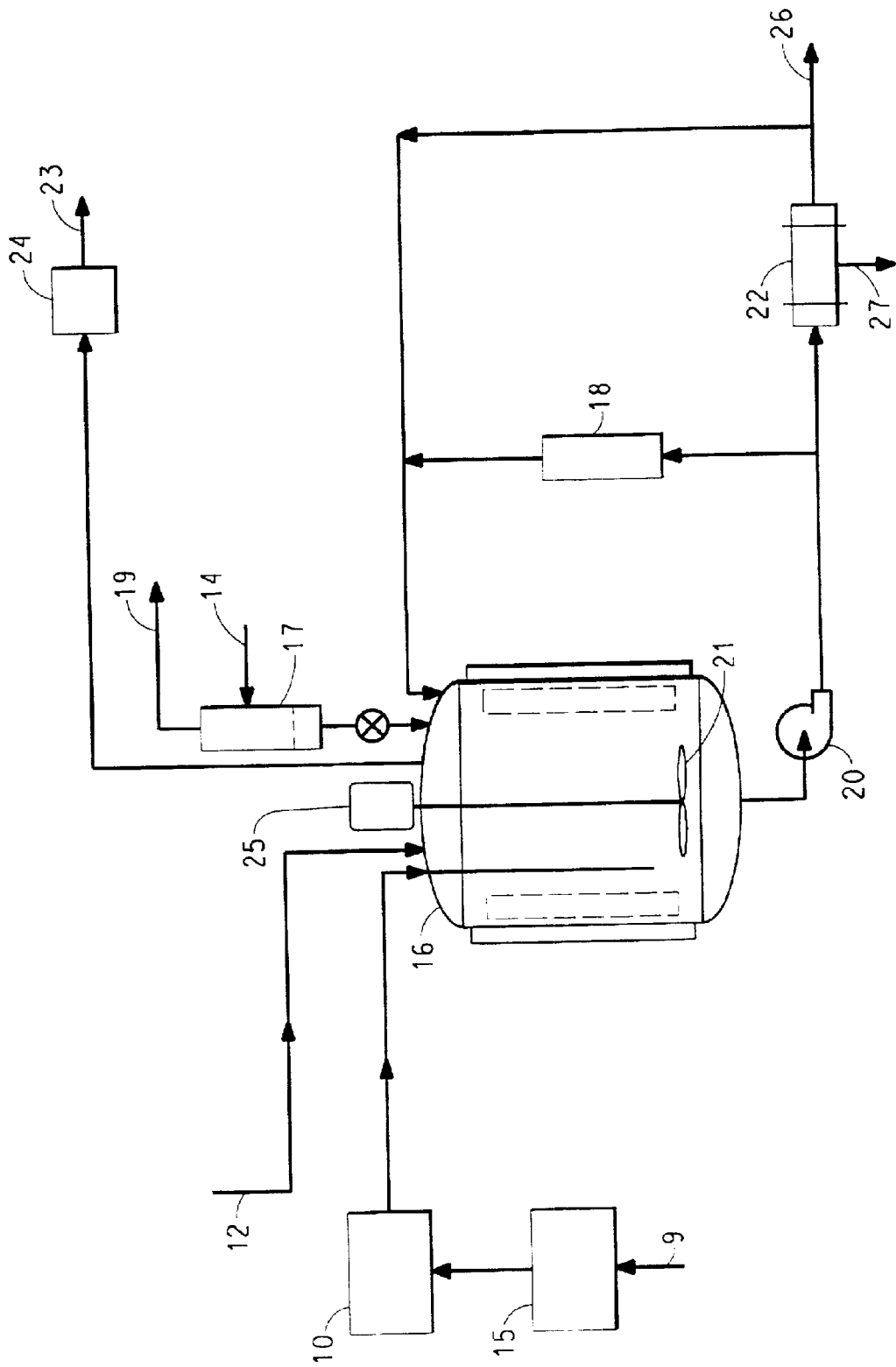
FIG. 1 is a flow diagram in schematic, illustrating a preferred embodiment of the process of the present invention.

The present invention provides processes for making self-dispersing pigment, a self-dispersing pigment made therefrom, and uses thereof. The term "self-dispersing" as it is generally understood in the art and used here, means a pigment having stabilizing groups covalently attached to the surface of the pigment particles such that the pigment forms a stable aqueous dispersion in the absence of any additional dispersing agents.

With reference to FIG. 1, the schematic diagram illustrates the preferred process of the invention. Basically, in the embodiment shown in FIG. 1, an ozone generator 10 generates ozone from compressed oxygen or air 9 fed into a storage, vaporization and feed tank 15 and delivers the ozone to a pre-mix tank 16. Water and pigment are also delivered to the pre-mix tank 16 via water supply 12 and pigment supply 14 via a solids dumping station 17 equipped with a hood, grating and rotary valve and having an exit to a dust collection system 19. The order in which the pigment, water and ozone are introduced into the pre-mix tank 16 is not particularly important, so long as the water is added before the ozone.

It is preferred that the reactants are agitated while in the pre-mix tank 16. The agitation can come in the form of bubbling the ozone vigorously into water and pigment mixture, from a magnetic stirring device, or from other suitable means. In a particularly preferred embodiment, the pre-mix tank 16 is a high speed disperser ("HSD"). Examples of an HSD include the G type or F type impeller 21 driven by motor 25 available from manufacturers like Hockeymer Co. In the working examples, the high speed dispersive impeller K-blade manufactured by Paul Gardner Company is used. The pre-mix tank has a vent to atmosphere 23 with an ozone destruction device 24.

To aid with the agitation and increase process efficiency, it is generally preferred to introduce the ozone in a manner that produces more and smaller bubbles as opposed to fewer and larger bubbles.

In the embodiment shown in FIG. 1, the reactants are pumped via pump 20 from the pre-mix tank 16 into a dispersive mixing apparatus 18. It has surprisingly been discovered that the addition of a dispersive mixing step in the wet oxidation of pigment with ozone results in a decrease in cycle time, and increase in yield and a decrease in acid value of the pigment compared to the same process without the dispersive mixing step.

Additional devices may be, and preferably are, employed in carrying out the inventive process. For example, purification apparatus 22 is desired to purify the reaction mixture after oxidation to remove permeate 27 containing any by-products, contaminants, free acids, salts, etc. and an ozone destruction device 24 is desirable to prevent release of ozone to atmosphere. Such devices, while useful, are not critical to the inventive process.

In all embodiments, the process of the invention requires the oxidation of pigment with ozone in an aqueous environment. As such, it is necessary to begin the process by bringing together water, ozone and pigment. The particular order that these three reactants are brought together, however, is not particularly important, except to note that oxidation of pigment without water (i.e., "dry" oxidation) is not within the scope of the invention. Thus, the pigment and water can be mixed together and the ozone then introduced, or the ozone and water can be mixed before introducing the pigment.

It is generally preferred for the water to be added to the pre-mix tank 16 via the water supply 12 and for the ozone to be bubbled into the pre-mix tank 16 and pump 20 activated to begin circulating the ozone and water from the pre-mix tank 16, through the dispersive mixing device 18 and back to the pre-mix tank 16. While the ozone and water are circulating through this loop, the pigment is slowly introduced into the pre-mix tank 16. The process is continued in this manner until the pigment is sufficiently oxidized and becomes self-dispersing. The resulting self dispersed pigment is removed and placed into storage containers.

By adding the pigment slowly to a circulating mixture of water and ozone, the viscosity of the reaction mixture remains lower than it would be if the pigment were added all at once, or if the pigment and water were mixed prior to introducing the ozone. The lower viscosity is advantageous because the process is more efficient when the viscosity is kept low. Furthermore, a low viscosity mixture is less taxing on the pumps, pre-mix apparatus and dispersive mixing device than a higher viscosity mixture. Thus, smaller scale equipment can be used (without sacrificing throughput) and it will last longer, which results in an overall improvement in process efficiency. In addition, when run in this manner, the process becomes essentially a continuous process as opposed to a batch process.

In another embodiment, the inventive process provides for the oxidation of pigment with ozone in the presence of an aqueous environment while maintaining a pH of 6–8. It has been discovered that as the pH of the oxidation mixture decreases, the viscosity of the mixture increases. The lower viscosity is advantageous for the same reasons noted immediately above. The relatively neutral pH can be maintained by the addition of a base to the reaction mixture. Suitable bases include both organic and inorganic bases, but care should be taken not to use an organic base that will be oxidized in the presence of ozone. For that reason, inorganic bases, particularly potassium hydroxide and sodium hydroxide, are most preferred.

In yet another embodiment, the invention provides a process for the wet oxidation of pigments with ozone to produce a self-dispersing carbon black pigment having an acid value of less than 3 $\mu$moles/M$^2$ and most preferably less than about 1.5 $\mu$moles/M$^2$. Prior to the present invention, it was generally believed that self-dispersing pigments needed to have relatively high acid values (as taught for example in EP 0 896 986) to form stable dispersion in water. The present inventors, contrary to this belief, have discovered that by subjecting the mixture of ozone, water and pigment to at least one dispersive mixing step, stable dispersions can be prepared with pigments having acid values ranging from about 0.7 to 1.40 $\mu$moles/M$^2$ to about 2.5 $\mu$moles/M$^2$.

In the present invention, acid value is determined by the volume of alkali or amine required to neutralize a predetermined weight of pigment in an aqueous dispersion. The acid value is expressed as milli-moles per gram ("mmoles/g") of pigment or micromoles per square meter of pigment surface area ("$\mu$moles/M$^2$").

The acid value (in mini-moles per gram) is calculated by the following equation when using 45 wt % (11.7 N) KOH to neutralize the mixture:

$$\text{Acid Value (mmoles/g)} = \frac{Ml \text{ of } KOH \times 11.7 \, N}{\text{sample weight (g)} \times \text{wt \% pigment}}$$

To convert that acid value to $\mu$moles per square meter, the following equation is used:

$$\text{Acid Value}(\mu\text{moles}/M^2) = \frac{\text{Acid Value (mmoles/g)}}{\text{surface area }(M^2/g)} \times \frac{1000 \, \mu\text{mole}}{\text{mmole}}$$

A back titration using 0.025 N HCl is normally practiced to quantify the excess base ("alkali or amine") when the pH of a dispersion exceeds 7:

| Excess base | | ml of HCl × 0.025 N | | 1000 $\mu$mole |
|---|---|---|---|---|
| ($\mu$moles/M$^2$) | = | pigment wt% × sample weight (g) × surface area (M$^2$/g) | × | mmole |

The acid value of the dispersion is obtained by subtracting the excess basic solvent from the total acid value. The standard deviation of acid value measurement is determined to be about 1.4%. It is rather unexpected and counter-intuitive that a treated carbon black pigment with a relative low acid value, that is, less than about 3 $\mu$moles/$M^2$, forms a more stable dispersion than a pigment with a higher acid value. This observation, however, is attributed to a more uniform functional group distribution on the pigment with less free acids created by the dispersive mixing step when performing the in-situ surface modification by ozone during grinding. Particle size distribution is also more uniform using the simultaneous ozone/dispersion process, particularly with much less oversized particles.

The manner of generating ozone for use in the process is not critical. Generally speaking, it is preferred to use commercially available ozone generation equipment for that purpose. Such equipment generates a gas stream containing between 1–20% by weight ozone, which is sufficient for the inventive process. Ozone is introduced into the bottom of the pre-mix tank 16, for example, using a dip tube at a flow rate of 3 to 5 liters per minute. Ozone concentrations are maintained at 5.0 to 6.5 wt % when using oxygen as the feed gas and 2.0 to 3.5 wt % when using air as the feed gas. It is particularly preferred to use oxygen as the carrier gas for the ozone, but noble gases may also be used. Most preferably, a gas stream comprising about 6% by weight ozone in oxygen is employed.

Other additives may be used in the reaction mixture besides the water, ozone, pigment and base. For example, the addition of hydrogen peroxide has been shown to shorten the cycle time and to decrease the formation of salts which need to be removed in the purification step. In addition, physically adsorbed dispersants or pigment wetting agents may be added to the reaction mixture, if desired. Examples of physically adsorbed dispersants and pigment wetting agents are familiar to those skilled in the art and include the structured polymeric dispersants described below, commercially available random and structured dispersants (e.g., ethylene oxide extended alkyl phenols), the family of dispersants available from BYK Chemie and the dispersants and wetting agents disclosed in McCutcheon's Emulsifiers and Detergents, published by Manufacturing Confectioners Publishing Company, Glen Rock, N.J. Of course, it is an advantage of the invention not to utilize such dispersants so, if they are used, they should not be used in amounts that would result in a stable dispersion absent the ozone treatment.

The process of the invention is generally applicable to all types of pigments that are subject to being rendered self-dispersing by oxidation. In other words, the process can be used with both black and color pigments and, more specifically, any color pigment that contains either aromatic groups or groups containing carbon-carbon double bonds on its surface. Because color pigments are generally more difficult to render self-dispersing, the invention is particularly well suited for use with carbon black pigments, but color pigments are by no means excluded.

Physical property and composition of pigments are important factors to attain a high quality performance of ink jet inks and coatings. In the present invention, the types of pigments to be used are not particularly limited. For the ink jet ink application, it is preferred to use pigments having a primary particle of size less than 30 nm. Surface area measured by BET method affects significantly the operating conditions to attain self-dispersing pigments. The higher the pigment surface area is, the longer the cycle time is usually needed. In the present invention, a variety of carbon blacks are used, including FW-18 and FW-200 manufactured by Degussa Corporation. FW-18 has a primary particle of 15 nm with a BET surface area of 260 $M^2$/g. FW-200 has a primary particle size of 13 nm with a BET surface area of 460 $M^2$/g. A number of other carbon black pigments also can be used, such as Raven 5000, Raven 3500, CD 2038, CD7035, CD6026, CD7004 from Columbian Chemicals Company, FW-1, Printex 150T, Color Black S160, Special Black 6 from Degussa Corporation and Vulcan XC72R, Monarch 1000 and Monarch 880 from Cabot.

Typical color pigments that can be used in the process of this invention to form self dispersing pigments are blue pigments, such as, Sunfast blue, from Sun Chemical Company, red pigments, such as Indofast Brilliant Scarlet, from Bayer, Company, Sunfast megenta from Sun Chemical Company, green pigments, such as, Heliogen green from BASF Corporation, yellow pigments, such as, Sunbrite yellow from Sun Chemical, yellow 131AK from Ciba Chemicals Corporation.

As noted above, it is preferred or required, depending on the embodiment, to subject the mixture of water, ozone and pigment to at least one dispersive mixing step. Most of mixing or stirring applications involve pumping and mass flow of liquid, liquid-solid, or liquid-gas. The intensity of mixing can be characterized by the energy input or the effective shear rate. The effective shear rate for mixing usually ranges from 50 to 200 $sec^{-1}$ (James Y. Oldshue, "Fluid Mixing Technology," p.29, 1983) and from 200 to 20,000 $sec^{-1}$ for dispersive mixing or dispersion (Temple C. Patton, "Paint Flow and Pigment Dispersion", p. 356, 1979). Accordingly, the term "dispersive mixing" is used herein to identify a mixing operation that provides an effective shear rate of at least 200 $sec^{-1}$. Such well known devices as a media mill, attritor, hammer mill, Microfluidizer® (from Microfluidics Corp), homogenizer, jet mill, fluid mill and similar high energy dispersing devices can be used to advantage in the present invention.

The type of device used for the dispersive mixing step will depend, to some extent, on the type of pigment being oxidized and the characteristics of the pigment. In general, color pigments need higher energy mixing as compared to the carbon black pigments and so-called "acidic" pigments need less energy than "neutral" pigments. The preceding statement is not meant to imply that the process will not work unless the proper mixing device is selected, but rather to note that more than one dispersive mixing step may be needed if the selected device lacks sufficient energy. In general, it has been found that media milling and passing the mixture through a plurality of nozzles within a liquid jet interaction chamber at a liquid pressure of at least 1000 psi (70 kg/$cm^2$), i.e., such as would occur in a Microfluidizer®, work well in the process and are especially preferred.

After the oxidation and dispersive mixing step(s), the pigment mixture is preferably purified. In the purification procedure, salts are removed from the pigment mixture (referred to herein as "desalination") and the mixture is filtered and centrifuged. The desalination process is preferably performed by ultrafiltration. At this point, the pigment mixture may be concentrated if desired by removal of some of the water. Prior to purification, it is preferred to cease the flow of ozone and to vent the pre-mix tank 16 to release any unreacted ozone, unless, of course, the process is being run as a continuous process as suggested above. The unreacted ozone is delivered to the ozone destruction device 24 and vented to atmosphere.

It is particularly preferred that the pigment be subjected to the dispersive mixing step immediately prior to being subjected to purification. In other words, it is not preferred that the pigment to be purified be drawn from the pre-mix tank 16, but is preferred that it be drawn from the stream exiting the dispersive mixing apparatus 18. The reason, as demonstrated in the working examples, is that a more stable and reliable ink jet ink (as measured by the number of cartridge nozzle failure as a function of aging) results.

The concentration of pigment that can be used in the process is not particularly critical and is more a function of the type of pigment and the type of equipment used in the process than it is a limitation on the process itself. Generally speaking, however, the maximum amount of pigment should not exceed 50 wt %. A pigment concentration of 5–20 wt %, especially about 10 wt %, is preferred for process efficiency.

The self-dispersing pigments produced by the process of the invention are particularly well suited for use in ink jet inks. Accordingly, in one embodiment, the present invention provides such inks. Generally speaking, ink jet inks comprise an aqueous vehicle, a colorant and various additives. The additives are selected to provide the ink with a desired property or effect, such as might be needed to adapt the ink to the requirements of a particular ink jet printer or to provide a balance of light stability, smear resistance, viscosity, surface tension, optical density, adhesion, or crust resistance, for example.

Aqueous Carrier Medium

The aqueous carrier medium is water or a mixture of water and at least one water-soluble or water-miscible (collectively referred to as "water-soluble") organic solvent. Selection of a suitable mixture depends on requirements of the specific application, such as, desired surface tension and viscosity, drying time of the ink, and the type of substrate onto which the ink will be printed. Representative water-soluble organic solvents that may be selected are disclosed in U.S. Pat. No. 5,085,698, the disclosure of which is incorporated herein by reference. A mixture of water and a polyhydric alcohol, such as diethylene glycol, is preferred as the aqueous carrier medium.

If a mixture of water and a water-soluble solvent is used, the aqueous carrier medium usually contains from about 30% to about 95% water with the balance (i.e., 70 to 5%) being the water-soluble solvent. Preferably, the aqueous carrier medium is 60–95%, most preferably 85 to 95%, by weight, water. The aqueous carrier medium comprises 70 to 99.8%, by weight of the total ink composition, most preferably 90 to 99% by weight.

Colorants

The colorant in the inks of this invention are the self-dispersing pigment prepared by the process described above. If desired, other colorants, such as conventional pigments or dyes, may also be used in combination with the self-dispersing pigments of this invention.

Useful pigments comprise a wide variety of organic and inorganic pigments, alone or in combination. The pigment particles need to be sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 microns, preferably 0.005 to 5 microns, and most preferably from 0.01 to 0.3 micron.

The ink may contain up to approximately 30% pigment by weight, but will generally be in the range of approximately 1 to 15%, preferably approximately 1 to 8%, by weight of the total ink composition for most ink jet printing applications.

The color and amount of dye present in the ink composition is largely a function of choice, being primarily dependent upon the desired color of the print achieved with the ink, the purity of the dye and its strength. Low concentrations of dye may not give adequate color vividness whereas high concentrations may result in poor printhead performance or unacceptably dark colors. Generally, if a dye is used, it will be present in the amount of 0.01 to 20%, preferably 0.05 to 8%, and most preferably 1 to 5%, by weight, based on the total weight of the ink composition.

Dispersant

If the ink contains a conventional pigment in addition to the self-dispersing pigments of this invention, it will be necessary to also use a dispersant to disperse the conventional pigment. Polymeric dispersants are preferred for use as dispersants in ink jet inks and, most preferred are polymer dispersants having a block, comb or branched architecture (so-called "structured polymers").

Polymeric dispersants suitable for use in ink jet ink are well known to those skilled in the art and need not be discussed in detail here. Particularly preferred dispersants for ink jet inks are disclosed in U.S. Pat. Nos. 4,597,794; 5,085,698; 5,272,201 and in EP 0 556 649 A1, the disclosures of which are incorporated herein by reference.

Additives

The ink may contain other additives that are commonly used in ink jet inks. For example, surfactants may be used to alter surface tension as well as maximize penetration of the ink into the print media. However, surfactants may have a negative effect on the stability of the pigment in the ink, so care should be taken in selecting the proper surfactant. In addition, the choice of a specific surfactant is highly dependent on the type of media substrate to be printed. In aqueous inks, the surfactants may be present in the amount of 0.01 to 5% and preferably 0.2 to 2%, based on the total weight of the ink.

Biocides, such as, Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.) and sodium benzoate may be used in the ink compositions to inhibit growth of microorganisms. Sequestering agents such as EDTA may also be included to eliminate deleterious effects of heavy metal impurities. Other known additives, such as humectants, viscosity modifiers and the like made also be added to improve various properties of the ink compositions.

One of the main advantages of using self-dispersing pigments is that the inks have very low viscosity which, in turn, permits the addition of various additives to provide desirable properties to the printed image. For example, it is known from the patent literature that certain types of polymer binders, when added to ink jet inks, can decrease the tendency of the ink to smear when, for example, printed text is struck with an office highlighter; can decrease the tendency of an ink to be washed off during laundering; can increase the adhesion of the ink to hydrophobic surfaces such as office transparencies and vinyl substrates; and can be used to improve the resistance of the printed ink to abrasion. See e.g., EP 0 974 607; U.S. Pat. Nos. 6,040,358; EP 0 851 014; 5,912,280 and 6,005,023, the disclosures of which are incorporated herein by reference. Therefore, it is most preferred that the inks of the present invention contain one or more polymer binders to provide such useful properties.

Ink Preparation and Properties

The inks are prepared by mixing together the self-dispersing pigment of this invention, the aqueous vehicle, any additional colorants and any additives. If a conventional pigment is being used as an additional colorant, it will be necessary to prepare a dispersion of the pigment and the selected dispersant. The preparation of the dispersion is well known to those skilled in the art.

It is generally desirable to make these ink jet inks in concentrated form. The concentrated ink jet inks are subsequently diluted to the appropriate concentration for use in the ink jet printing system. This technique permits preparation of a greater quantity of ink from the equipment. Prior to use, the concentrate is then diluted to the desired concentration with appropriate solvents which contain the water soluble binder additive. By dilution, the ink is adjusted to the desired viscosity, color, hue, saturation density, and print area coverage for the particular application.

One preferred self-dispersing pigment concentrate comprises water and pigment wherein the pigment has a mean particle size of less than 0.2 microns and has a charge density measured by zeta potential lower than −50 mv.

Another preferred self-dispersing pigment concentrate comprises water and pigment wherein the pigment has a conductivity of less than 0.15 S/m (Seimen/meter) and counter ions of less than 0.15 moles per liter.

Jet velocity, separation length of the droplets, drop size, and stream stability are greatly affected by the surface tension and the viscosity of the ink. Ink jet inks suitable for use with ink jet printing systems should have a surface tension in the range of about 20 dyne/cm to about 70 dyne/cm and, more preferably, in the range 30 dyne/cm to about 70 dyne/cm. An acceptable viscosity is no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand. The inks have excellent storage stability for a long period and do not clog in an ink jet apparatus. Fixing the ink on the image recording material, such as, paper, fabric, film, etc., can be carried out rapidly and accurately. The printed ink images have clear color tones, high density, excellent water resistance and lightfastness. Furthermore, the ink does not corrode parts of the ink jet printing device it comes in contact with.

WORKING EXAMPLES

The invention will now be further illustrated by, but not limited to, the following examples, in which parts and percentages are by weight unless otherwise noted. Unless otherwise stated, ozone was generated using ozone generator model GL-1 manufactured by PCI-WEDECO using either air or industrial grade oxygen as the feed gas. Particle sizes were determined using a Microtrac® UPA150 model analyzer manufactured by Honeywell. Viscosity was determined using a Brookfield viscometer with a UL adapter from Brookfield Instruments. Optical density was determined using a MacBeth densitomiter.

Example 1

600 grams of FW-18 was loaded into an HSD vessel with 4,400 grams of de-ionized water. The tip speed was kept at 5.5 m/sec to pre-wet the pigment for 30 minutes before the ozone treatment, then increased to 11 m/sec during the ozone treatment. Ozone was maintained at a concentration of 5.5 to 6.0 wt % and was fed into the bottom of the HSD vessel at a flow rate of 4.5 liters per minute. Sodium hydroxide was added to the mixture in order to increase its pH to 7 after a three hours treatment. After adjusting pH, the mixture was then re-circulated through a Microfluidizer® M110F for 5 hours. Sodium hydroxide was periodically added to the mixture to maintain a pH between 6.5 and 7.5. The product was self-dispersible without any particle sedimentation or gelation after more than 6 months of storage at room temperature.

Example 2

600 grams of FW-18 and 250 grams of hydrogen peroxide were loaded into an HSD vessel with 5,150 grams of de-ionized water. Operating conditions were the same as those described in Example 1 except that a four-hour treatment was performed before sodium hydroxide was added to increase the pH to 7. After the pH was adjusted, the mixture was processed for four hours through a Microfluidizer® M110F with periodic pH adjustments to maintain a pH between 6.5 and 7.5. The mixture was further purified by ultra-filtration using UFP-100E cartridge manufactured by A/G Technology with a membrane pore size rating of 100,000 molecular weight. The purification process was performed by pumping the mixture from a container to the cartridge at a flow rate of 10 to 15 liters per minute. The cartridge inlet pressure was maintained at 3 to 5 psig (210.9–351.5 g/cm$^2$). After passing the mixture through the cartridge, the mixture was recircluated back to the container while the liquid permeate passing through the membrane was removed. The de-ionized water was periodically added to the container to compensate the permeate being removed so that the quantity of the filtered product remained the same as that of the starting material. The ultrafiltration wash cycle was defined as the volumetric ratio of permeate being removed to the starting mixture. In this example, a total of five wash cycles was carried out. The resulting pigment was self-dispersible and had no sedimentation or gelation.

Example 3

600 grams of FW-18 was loaded into an HSD vessel with 5,400 grams of de-ionized water. Operating conditions were the same as those described in Example 2 except that potassium hydroxide was used to neutralize the mixture and that a six-hour treatment was performed before adding the neutralizing agent. The mixture was processed for three hours in a Microfluidizer®. The mixture was further purified by ultra-filtration for two wash cycles. The pigment resulting was self-dispersing and stable.

Example 4

600 grams of FW-18 was loaded into an HSD vessel with 4,400 grams of de-ionized water. Operating conditions were the same as those in Example 3 except that the mixture was processed in a Mircrofluidzer® for 5 hours. The mixture was purified by ultra-filtration for four wash cycles.

Example 5

650 grams of FW-18 was loaded into an HSD vessel with 4,350 grams of de-ionized water. Operating conditions were the same as those in Example 2 except that the mixture was processed in a Microfluidizer® for six hours. The mixture was further purified by ultra-filtration for four wash cycles.

Example 6

400 grams of FW-200 from Degussa was loaded into an vessel with 3,600 grams of de-ionized water. Operating conditions were the same as those in Example 1 except that the mixture was washed for three cycles via ultrafiltration. This mixture was self-dispersible without any sedimentation or gelation.

Example 7

200 grams of carbon black FW-18 manufactured by Degussa was loaded into a cylindrical vessel with 3,800 grams of de-ionized water. The mixture was stirred at a tip speed of 3.5 m/sec to pre-wet the pigment. Ozone at a concentration of 6 wt % was introduced into the mixing vessel at a flow rate of 4 liters per minute. The tip speed was increased to 6.9 m/sec after a two-hour treatment to increase the intensity of mixing. The mixture was then processed through a Microfluidizer® while continuing the ozone treatment for an additional 5 hours. No washes were performed for this mixture through ultrafiltration.

Example 8 (Comparative)

200 grams of carbon black FW-18 manufactured by Degussa was loaded into a cylindrical vessel with 3,800 grams of de-ionized water. The mixture was stirred at a tip speed of 3.5 m/sec to pre-wet the pigment. Ozone at a concentration of 6 wt % was introduced into the mixing vessel at a flow rate of 4 liters per minute. The tip speed was increased to 6.9 m/sec after a two-hour treatment to increase the intensity of mixing. A total treatment time was 5 hours. Within a day, this mixture had a substantial particle settlement at the bottom of the container.

Example 9 (Comparative)

400 grams of carbon black FW-18 was loaded into the vessel used in Example 8 with 3,600 grams of de-ionized water. Ozone at a concentration of 3 wt % was introduced into the mixing vessel at a flow rate of 5 liters per minute. The tip speed was kept at 3.5 m/sec for the first hour of treatment then increased to 6.9 m/sec. A total of 20 hours treatment was performed. There was no sedimentation observed for this mixture; however, the mixture was gelled within a few days.

Processing conditions and physical data regarding Examples 1–9 is set forth in Table 1, below. That data shows that pigments prepared by the process having a dispersive mixing or dispersion step have significantly lower particle sizes and narrower particle size distribution as compared to pigments treated in a process without a dispersive mixing step. In addition, the data shows that pigments prepared with a dispersive mixing step produce stable, self-dispersing pigments whereas those pigments treated without a dispersive mixing step were not stable. The data also show that the process of this invention produces stable, self-dispersing black pigments having an acid value below about 3 $\mu$moles/$M^2$ and is a quicker, more efficient process versus the wet ozone oxidation process of the prior art.

TABLE 1

| | Pigment (wt %) | Process time (hrs.) HSD | Process time (hrs.) MF Dispersion | Neutralizing agent | pH | Ultrafiltration Wash cycles | Particle Size (nm) D50 | Particle Size (nm) D90 | Acid Value ($\mu$mole/$M^2$) | Comments |
|---|---|---|---|---|---|---|---|---|---|---|
| Ex. 1 | 12 | 3 | 5 | NaOH | 6.3 | 0 | 106 | 169 | 0.71 | Self-dispersed & Stable |
| Ex. 2 | 10.5 | 4 | 4 | NaOH | 6.9 | 5 | 86 | 144 | 1.28 | Self-dispersed & Stable |
| Ex. 3 | 10.5 | 6 | 3 | KOH | 7.36 | 2 | 90 | 154 | 1.4 | Self-dispersed & Stable |
| Ex. 4 | 10.5 | 6 | 5 | KOH | 6.2 | 4 | 92 | 163 | 0.99 | Self-dispersed & Stable |
| Ex. 5 | 12 | 4 | 6 | NaOH | 6.6 | 4 | 100 | 187 | 1.03 | Self-dispersed & Stable |
| Ex. 6 | 10 | 5 | 6 | NaOH | 6.8 | 3 | 94 | 139 | 1.75 | Self-dispersed & Stable |
| Ex. 7 | 5 | 2 | 5 | — | 2.55 | 0 | 90 | 159 | 1.12 | Self-dispersed & Stable |
| Ex. 8 | 5 | 5 | 0 | — | 2.6 | 0 | 138 | 270 | 0.66 | Settled |
| Ex. 9 | 10 | 20 | 0 | — | 2.8 | 0 | 156 | 249 | 4.6 | Gelled |

Ink Jet Ink Formulation

The utility of the invention is illustrated by preparing ink jet inks from the self-dispersing pigments of Examples 1–5. The inks were prepared by mixing together the ingredients identified below (in parts by weight) with stirring to form a homogeneous mixture.

Example 10 (Comparative)

As a comparison, an ink was prepared according to the teachings of U.S. Pat. No. 5,519,085 using unprocessed FW-18 pigment and an ABC triblock polymeric dispersant comprising an A block of ETEGMA, a B block of BzMA and a C block of MAA with a degree of polymerization of 3.6, 13.6 and 10.8, respectively, was prepared as follows:

A 3-liter flask was equipped with a mechanical stirrer, thermometer, $N_2$ inlet, drying tube outlet, and addition funnels. 291.3 gm of THF was charged to the flask. The catalyst tetrabutyl ammonium m-chlorobenzoate, 0.44 ml of a 1.0 M solution in acetonitrile, was then added. Initiator, 1,1-bis(trimethylsiloxy)-2-methyl propene, 20.46 gm (0.0882 M) was injected. Feed I [tetrabutyl ammonium m-chlorobenzoate, 0.33 ml of a 1.0 M solution in acetonitrile and THF, 16.92 gm] was started and added over 185 minutes. Feed II [trimethylsilyl methacrylate, 152.00 gm (0.962 M)] was started at 0.0 minutes and added over 45 minutes. One hundred and eighty minutes after Feed II was completed (over 99% of the monomers had reacted) Feed III [benzyl methacrylate, 211.63 gm (1.20 M) was started and added over 30 minutes. Forty minutes after Feed III was completed (over 99% of the monomers had reacted) Feed IV [ethoxytriethyleneglycol methacrylate, 78.9 gm (0.321 M)] was started and added over 30 minutes. At 400 minutes, 73.0 gm of methanol and 111.0 gm of 2-pyrrolidone was added to the above solution and distillation begins. During the first stage of distillation, 352.0 gm of material was removed. Then more 2-pyrrolidone, 340.3 gm, was added and an additional 81.0 gm of material was distilled out. Finally, 2-pyrrolidone, 86.9 gm total, was added. The final polymer was at 40.0% solids.

| Ingredients | Example 10 | Examples 1–5 |
|---|---|---|
| Water | 77.8 | 79.9 |
| Pigment | 3.75 | 3.75 |
| 2-pyrrolidone | 9.0 | 9.0 |
| Liponics ® EG-1 | 5.0 | 5.0 |
| iso-propanol | 2.0 | 2.0 |
| n-propanol | 0.2 | 0.2 |
| Proxel ® (biocide from Avecia) | 0.125 | 0.125 |
| ABC tri-block dispersant | 1.875 | 0 |

Print Test

The inks so prepared were loaded into an HP51645A model ink jet cartridge (Hewlett-Packard) and printed onto plain paper using a DeskJet 870C ink jet printer (Hewlett-Packard). The stability of the inks was determined by measuring particle size before and after the inks were subjected to a freeze/thaw cycle (i.e., 8 hours at −20° C. followed by 4 hours at 60° C). Data is reported in the table below. The data show that the inks of this invention have higher optical density (at the same pigment load) lower viscosity and are at least as stable as conventional pigmented ink jet inks.

|  | Viscosity cps @ 25° C. | Particle Size (nm) D50 before | Particle Size (nm) D50 after | Surface Tension dyne/cm | pH | Optical Density |
|---|---|---|---|---|---|---|
| Ex. 1 | 2.34 | 98.2 | 94.7 | 69.7 | 5.5 | 1.43 |
| Ex. 2 | 3.05 | 73.6 | 76 | 69.4 | 6.74 | 1.38 |
| Ex. 3 | 2.98 | 81.9 | 84.5 | 70.2 | 6.69 | 1.37 |
| Ex. 4 | 2.4 | 88.3 | 88.2 | 69.4 | 6.49 | 1.45 |
| Ex. 5 | 2.56 | 97.3 | 102.1 | 70.2 | 6.5 | 1.5 |
| Ex. 10 | 3.0 | 100 | 105 | 54 | 8.0 | 1.15 |

To demonstrate the advantage of using the dispersive mixing step as the last step in the process, inks were using a self-dispersing carbon black pigment. In one sample, the pigment was sent through a Microfluidizer® M110F immediately before purification. In another sample, the pigment was purified from the HSD tank. The inks were loaded into an HP51645A ink jet cartridge (Hewlett-Packard) and stored for 6 weeks in a nozzles down position. The ink cartridges were then placed into a printer and the number of non-firing nozzles determined. The average number of failed nozzles for the pigment purified from the HSD tank was 15.1 compared to an average of 4.3 for the sample purified from the Microfluidizer®.

Example 11

500 grams of Sunfast blue PB15:3 pigment at 49.01% in water from Sun Chemical Company was loaded into an HSD vessel with 4,502 grams of de-ionized water. The HSD tip speed was kept at 3.9 m/sec to pre-wet pigment for 30 minutes. The mixture was then treated with ozone at 7.5% for three hours. Ozone was fed into the bottom of vessel at a flow rate of 1.5 liters/min. Lithium hydroxide was added to the mixture to increase its pH to 7.2. The tip speed was then increased to 8 m/sec and the mixture was re-circulated through a Microfluidizer® M110F for a total of 23 hours. Lithium hydroxide was periodically added to the mixture to maintain a pH between 7.0 and 8.5. The mixture was further purified by ultra-filtration UFP-500E9A cartridge for 5 wash cycles. The resulting pigment achieved a mean particle size of 154 nm with an acid number of 3.47 micromoles/m$^2$. The mixture was self-dispersible and had no sedimentation or gelation after exposing to a series of thermal cycles between 60° C. and −20°. Ink was prepared from this dispersion using a standard inkjet ink vehicle and a pigment concentration of 3.5%, The ink was printed using thermal inkjet printer to obtain a relative optical density of 1.05 on plain paper.

Example 12

200 grams of Indofast Brilliant Scarlet R-6335 PR123 from Bayer Company was loaded into an HSD vessel with 3800 grams of de-ionized water. The HSD tip speed was kept at 2 m/sec to pre-wet pigment for 60 minutes. The mixture was then treated with ozone at 8.6% for two hours. Ozone was fed into the bottom of vessel at a flow rate of 4.5 liters/min at a concentration of 8.4 to 9.6%. Lithium hydroxide was added to the mixture to increase its pH to 8.0. The mixture was then re-circulated through Eiger Minimill M750 using 0.5 mm YTZ media at 80% load. The mill was kept at 4,000 RPM during the re-circulation grinding. A total of 16 hours ozone treatment was performed while grinding. Lithium hydroxide was periodically added to the mixture to maintain a pH between 7.0 and 7.5. The resulting pigment achieved a mean particle size of 112 nm. The acid number was 33.3 micromoles/m$^2$. 74 grams of an acrylic water soluble polymer at a solids of 15% in water was further added to the mixture. The mixture with polymer was processed in M750 for another 8 hours and then purified by ultra-filtration for 5 wash cycles. A mean particle size of 97 nm was achieved. The resulting pigment was stable after 3 weeks at 60 C without any sedimentation or gelation. Ink was prepared from this dispersion using a standard inkjet ink vehicle and a pigment concentration of 3.5%, The ink was printed using thermal inkjet printer to obtain a relative optical density of 0.74 on plain paper.

Example 13

694 grams of 50% solids presscake PR122 Sunfast magenta (428-5024) from Sun Chemical was loaded into the HSD vessel with 2773 grams of de-ionized water. The HSD tip speed was kept at 5.3 m/sec to pre-wet the pigment for 2 hours before the ozone treatment. Tip speed was maintained at 5.3 m/sec during the ozone treatment. Ozone was maintained at a concentration of 8.0–9.4 wt % and was fed into the bottom of the HSD vessel at a flow rate of 1.4–1.8 liters per minute. Potassium hydroxide was added to the mixture hourly to maintain its pH at 6. During the first 8 hours of ozonation, 20–100% of the volume were fed through an Eiger minimill once an hour, recirculated for 1–5 minutes, then returned to the HSD vessel. KOH was then added to the sample to raise the pH to 8. The sample was then ultrafiltered through a permeable membrane cartridge filter from AG Technology Corp., Needham, Mass. to remove excess salt. The next 7 hours of ozonation alternated with reducing particle size in a Controlled Cavitation unit from 5-Star Technologies, Cleveland, Ohio ozonating, KOH addition, and ultrafiltering. Total residence time in the Controlled Cavitation unit was 150 minutes. The final particle size of 103 nm, with 98% of the particles <204 nm, was achieved. The product of this process continues to be self-dispersed after 4 weeks of accelerated aging at 60C. Ink was prepared from this dispersion using a standard inkjet ink vehicle and a pigment concentration of 3%, The ink was printed using both thermal and piezo inkjet printheads.

What is claimed is:

1. A process for making a self-dispersing pigment comprising the step of oxidizing a pigment with ozone in an aqueous environment while simultaneously subjecting the pigment to at least one dispersive mixing operation.

2. The process of claim 1, wherein the pigment is present in an amount of up to 50% by weight.

3. The process of claim 2, wherein the pigment is present in an amount of 5 to 20% by weight.

4. The process of claim 1, wherein the aqueous environment includes hydrogen peroxide.

5. The process of claim 1, wherein the ozone comprises 1 to 20% by weight ozone in a carrier gas.

6. The process of claim 5, wherein the ozone comprises 6% by weight ozone in oxygen.

7. The process of claim 1, wherein the pigment is carbon black.

8. The process of claim 1, wherein the pigment is an organic colored pigment.

9. The process of claim 1, wherein the process further includes a pre-mixing operation.

10. The process of claim 9, wherein the pre-mixing operation comprises agitating the mixture in a high speed dispersing apparatus.

11. The process of claim 1, wherein the process is carried out at a pH of 6 to 8.

12. The process of claim 1, wherein the aqueous environment being an aqueous medium and ozone are mixed together prior to introduction of the pigment.

13. The process of claim 12, wherein the pigment is not introduced to the aqueous medium/ozone mixture all at once.

14. The process of claim 1, wherein the pigment is oxidized to an acid value of less than 3 $\mu$moles/M$^2$.

15. The process of claim 1, wherein the dispersive mixing operation comprises media milling and passing the mixture through a plurality of nozzles within a liquid jet interaction chamber at a liquid pressure of at least 1000 psi.

16. The process of claim 1, further comprising the step of purifying the self-dispersing pigment.

17. A process of making a self-dispersing pigment comprising the step of oxidizing a pigment with ozone in an aqueous medium while maintaining a pH of 6 to 8.

18. The process of claim 17, wherein the pH is maintained by addition of a base.

19. The process of claim 18, wherein the base is selected from the group consisting of potassium hydroxide and sodium hydroxide.

20. The process of claim 17, wherein the pigment is present in an amount of 5 to 20% by weight.

21. The process of claim 17, wherein the aqueous medium includes hydrogen peroxide.

22. The process of claim 17, wherein the ozone comprises 1 to 20% by weight ozone in a carrier gas.

23. The process of claim 17, wherein the pigment is carbon black.

24. The process of claim 17, wherein the pigment is an organic colored pigment.

25. The process of claim 17, wherein the process further comprises subjecting the mixture of ozone, pigment and aqueous medium to a pre-mixing operation which comprises agitating the mixture in a high speed dispersing apparatus.

26. The process of claim 17, wherein the aqueous medium and ozone are mixed together prior to introduction of the pigment.

27. The process of claim 17, wherein the pigment is not introduced to the aqueous medium/ozone mixture all at once.

28. The process of claim 17, wherein the process further comprises a dispersive mixing operation which comprises subjecting a mixture of ozone, pigment and aqueous medium to an operation selected from the group consisting of media milling and passing the mixture through a plurality of nozzles within a liquid jet interaction chamber at a liquid pressure of at least 1000 psi.

29. The process of claim 17, wherein the pigment is oxidized to an acid value of less than 3 $\mu$moles/M$^2$.

30. The process of claim 17, further comprising the step of purifying the self-dispersing pigment.

31. A process for making a self-dispersing pigment comprising the step of oxidizing a pigment with ozone in an aqueous medium to produce a self-dispersing pigment having an acid value of less than 3 $\mu$moles./M$^2$.

32. A self-dispersing pigment prepared according to the process of claim 14.

33. A self-dispersing pigment prepared according to the process of claim 29.

34. A self-dispersing pigment prepared according to the process of claim 31.

35. An ink jet ink composition comprising an aqueous vehicle and a colorant, wherein the colorant comprises a self-dispersing pigment according to claim 32.

36. The ink composition of claim 35, further comprising at least one additive selected from the group consisting of surfactants, humectants, biocides, sequestering agents, viscosity modifiers, and polymeric binders.

37. An ink jet ink composition comprising an aqueous vehicle and a colorant, wherein the colorant comprises a self-dispersing pigment prepared according to claim 33.

38. The ink composition of claim 37, further comprising at least one additive selected from the group consisting of surfactants, humectants, biocides, sequestering agents, viscosity modifiers, and polymeric binders.

39. An ink jet ink composition comprising an aqueous vehicle and a colorant, wherein the colorant comprises a self-dispersing pigment according to claim 34.

40. The ink composition of claim 39, further comprising at least one additive selected from the group consisting of surfactants, humectants, biocides, sequestering agents, viscosity modifiers, and polymeric binders.

41. An ink concentrate composition comprising an aqueous vehicle and a colorant wherein the colorant comprises a self dispersing pigment according to claim 32 wherein the pigment has a mean particle size of less than 0.2 microns and has a charge density measured by zeta potential lower than −50 mv.

42. An ink concentrate composition comprising an aqueous vehicle and a colorant wherein the colorant comprises a self dispersing pigment according to claim 32 wherein the pigment has a conductivity of less than 0.15 S/m (Seimen/meter) and counter ions of less than 0.15 moles per liter.

* * * * *